(12) United States Patent
Jang et al.

(10) Patent No.: US 11,366,581 B2
(45) Date of Patent: Jun. 21, 2022

(54) DISPLAY APPARATUS, SERVER AND CONTROL METHOD FOR APPLYING TRANSFER STYLE TO IMAGES USING ARTIFICIAL INTELLIGENCE

(71) Applicant: SAMSUNG ELECTRONICS CO., LTD., Suwon-si (KR)

(72) Inventors: Jeongrok Jang, Suwon-si (KR); Kwansik Yang, Suwon-si (KR); Jaehwang Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/596,146

(22) Filed: Oct. 8, 2019

(65) Prior Publication Data

US 2020/0117348 A1 Apr. 16, 2020

(30) Foreign Application Priority Data

Oct. 12, 2018 (KR) .................. 10-2018-0121835

(51) Int. Cl.
*G06F 3/04845* (2022.01)
*G06F 3/0482* (2013.01)
*G06F 3/14* (2006.01)

(52) U.S. Cl.
CPC ........ *G06F 3/04845* (2013.01); *G06F 3/0482* (2013.01); *G06F 3/14* (2013.01)

(58) Field of Classification Search
CPC ...... G06F 3/0482; G06F 3/04845; G06F 3/14; G06T 11/001; G06T 1/00; G06T 2207/20084; G06T 2207/20092; G06T 5/005; G06T 5/50; G06T 11/00
See application file for complete search history.

(56) References Cited

U.S. PATENT DOCUMENTS

| 8,908,987 | B1* | 12/2014 | Krishnaswamy ....... G06T 5/001 382/260 |
| 9,361,666 | B2 | 6/2016 | Paris et al. |
| 9,857,953 | B2 | 1/2018 | Sunkavalli et al. |
| 10,198,839 | B2 | 2/2019 | Rymkowski et al. |
| 2005/0047684 | A1 | 3/2005 | Baum et al. |
| 2009/0154762 | A1 | 6/2009 | Choi et al. |
| 2009/0319897 | A1* | 12/2009 | Kotler ................... G06T 11/60 715/711 |

(Continued)

FOREIGN PATENT DOCUMENTS

| CN | 107171932 A | 9/2017 |
| CN | 108537776 A | 9/2018 |
| KR | 10-2016-0057845 A | 5/2016 |

OTHER PUBLICATIONS

Kapoor et al., "Collaborative Personalization of Image Enhancement", International Journal of Computer Vision., vol. 108, No. 1-2, DOI 10.1007/s11263-013-0675-3, Dec. 11, 2013, pp. 148-164, 17 pages total, XP055248786.

(Continued)

*Primary Examiner* — Tan H Tran
(74) *Attorney, Agent, or Firm* — Sughrue Mion, PLLC

(57) ABSTRACT

Disclosed is a display apparatus displays a first image selected based on a user input, obtains, from a server, a second image having a transfer style, the transfer style preferred by a user from among a plurality of transfer styles, and displays the second image.

6 Claims, 20 Drawing Sheets

(56) References Cited

U.S. PATENT DOCUMENTS

| | | | |
|---|---|---|---|
| 2011/0270947 A1 | 11/2011 | Cok et al. | |
| 2015/0098646 A1 | 4/2015 | Paris et al. | |
| 2016/0364625 A1* | 12/2016 | Lin | G06T 7/90 |
| 2017/0139572 A1 | 5/2017 | Sunkavalli et al. | |
| 2018/0082407 A1 | 3/2018 | Rymkowski et al. | |
| 2018/0322614 A1* | 11/2018 | Petrova | G06T 5/20 |
| 2019/0026870 A1* | 1/2019 | Hu | G06T 5/005 |
| 2020/0007785 A1* | 1/2020 | Osuka | H04N 5/23212 |
| 2020/0082249 A1* | 3/2020 | Hua | G06T 11/001 |

OTHER PUBLICATIONS

Hong et al., "Unified Photo Enhancement by Discovering Aesthetic Communities From Flickr", IEEE Transactions on Image Processing, vol. 25, No. 3, Mar. 1, 2016, pp. 1124-1135, 12 pages total, XP011596049.

Communication dated Feb. 18, 2020 issued by the European Patent Office in counterpart European Application No. 19202468.5.

International Search Report and Written Opinion dated Feb. 5, 2020 issued by the International Searching Authority in counterpart Application International No. PCT/KR2019/012731 (PCT/ISA/210 and PCT/ISA/237).

Communication dated Oct. 29, 2020 issued by the European Patent Office in European Application No. 19202468.5.

Communication dated Jul. 5, 2021, issued by the European Patent Office in European Application No. 19202468.5.

Talebi et al., "NIMA: Neural Image Assessment", Cornell University Library, XP081149874, ARXIV:1709.05424V2, Apr. 26, 2018, 15 pages total.

Communication dated Apr. 11, 2022, by the European Patent Office in European Patent Application No. 19202468.5.

Communication dated Mar. 30, 2022 by the China National Property Administration in Chinese Patent Application No. 201980061528.0.

* cited by examiner

DISPLAY APPARATUS, SERVER AND CONTROL METHOD FOR APPLYING TRANSFER STYLE TO IMAGES USING ARTIFICIAL INTELLIGENCE

CROSS-REFERENCE TO RELATED APPLICATION(S)

This application claims priority from Korean Patent Application No. 10-2018-0121835 filed on Oct. 12, 2018, in the Korean Intellectual Property Office, the disclosure of which is herein incorporated by reference.

BACKGROUND

1. Field

Apparatuses and methods consistent with the embodiments relate to a display apparatus and a control method thereof, and more particularly to a display apparatus that recommends an image having a particular style, a server, and a control method thereof.

2. Description of the Related Art

A style transfer service refers to a technique that applies a style to a base image according to selection of the style by a user, without changing a main content of the image. The style of the image may be a style of a famous artist, or the style of a genre, such as impressionism, surrealism, cubism, expressionism, post-impressionism, pop art, art nouveau, neoclassicism, and other styles of art.

There are no restrictions on styles that may be provided by a style transfer service. In other words, the style transfer service may provide images of various styles generated from a base image.

However, when a plurality of styles are available, a conventional style transfer service is inconvenient for a user because the user should select a style to be applied to the base image, from among many styles with which the user might not be familiar. In particular, the style transfer service may be cumbersome because a user unfamiliar with a particular style may be required to apply the style, and only after applying the style may the user check the transferred image. As the quantity of the possible styles to be applied to the base image increases, the style transfer service may become more inconvenient and difficult for a user to utilize.

SUMMARY

An aspect of one or more embodiments is to provide a display apparatus and a server, in which an image of a transfer style expected to be preferred by a user is automatically recommended.

According to one embodiment, there is provided a display apparatus including: a display; a communicator; and a processor configured to: control the display to display a first image selected by a user of the display apparatus, obtain, from a server through the communicator, a second image having a transfer style, the transfer style being preferred by the user from among a plurality of transfer styles, and control the display to display the second image.

The processor may replace the first image with the second image selected based on a user input for selecting one of a plurality of second images, and displays the selected second image.

The processor may register the selected second image as a user favorite style.

According to one embodiment, there is provided a server including: a communicator; and a processor configured to: receive information about a first image selected by a user from a display apparatus, identify a transfer style preferred by the user from among a plurality of transfer styles, and transmit a second image having the transfer style to the display apparatus.

The processor may identify the transfer style being expected to be preferred by the user among the plurality of transfer styles, based on an artificial intelligence (AI) model that has learned a plurality of user preferences to a plurality of images.

The processor may identify a category of the first image, and identifies the transfer style corresponding to the identified category of the first image.

The processor may obtain information about a user favorite style information, and identifies the transfer style based on the obtained information about the user favorite style.

According to one embodiment, there is provided a display apparatus including: a display; a storage; a communicator; and a processor configured to: receive, from a server through the communicator, a second image having a first transfer style, the first transfer style being preferred by a user of the display apparatus from among a plurality of transfer styles, control the storage to store the second image, control the display to display the second image, based on selection of a first image corresponding to a first user input, receive a third image having a second transfer style, the second transfer style preferred by the user from among the plurality of transfer styles, from the server based on a second user input requesting another transfer style, and control the display to display the third image having the second transfer style.

The processor may add a selected transfer style to the first transfer style based on a user input for selecting one of the received second image of the second transfer style, and transmits the first transfer style added with the selected transfer style to the server.

According to one embodiment, there is provided a display apparatus including: a display; a storage; a communicator; and a processor configured to: control to store in the storage a list of transfer styles, by which at least one characteristic of an image is differently converted, received from a server through the communicator, control the display to display a first image selected based on a user input, generate a second image by converting a characteristic of the first image, based on the list of transfer styles, and control the display to display the second image.

The processor may obtain the second image of transfer style expected to be preferred by a user from the server through the communicator and controls the display to display the obtained second image, based on a second user input for requesting another transfer style.

The processor may add a selected transfer style to the stored list of transfer style, based on a user input for selecting one of the second image of the obtained second transfer style.

According to one embodiment, there is provided a server including: a communicator; and a processor configured to: receive a request from a display apparatus that requests a list of transfer styles by which a characteristic of an image is differently converted, generate the list of the transfer style based on a preference of a user of the display apparatus, and transmit the list of the transfer styles to the display apparatus.

The processor may identify the transfer style expected to be preferred by a user among transfer styles other than the list of transfer styles and transmits the identified transfer style to the display apparatus, based on the request from the display apparatus that requests another transfer style.

The processor may modify transfer a characteristic of a transfer style relatively not preferred by the user, based on information about a user favorite style.

According to one embodiment, there is provided a method of controlling a display apparatus, including: displaying a first image selected based on a user input of a user of the display apparatus; obtaining, from a server, a second image having a transfer style, the transfer style being preferred by the user from among a plurality of transfer styles; and displaying the second image.

According to one embodiment, there is provided a method of controlling a server, including: receiving information about a first image selected by a user from a display apparatus; identifying a transfer style preferred by the user from among a plurality of transfer styles; and transmitting a second image having the transfer style to the display apparatus.

The identifying may comprise identifying a category of the first image, and identifying the transfer style corresponding to the identified category of the first image.

The method may further comprise modifying a characteristic of a transfer style not preferred by the user, based on information about a favorite transfer style of the user.

According to one embodiment, there is provided a computer program stored in a computer-readable recording medium to any of the methods described herein.

BRIEF DESCRIPTION OF THE DRAWINGS

The above and other aspects will become apparent and more readily appreciated from the following description of embodiments, taken in conjunction with the accompanying drawings, in which.

DETAILED DESCRIPTION OF EMBODIMENTS

Figure 1:
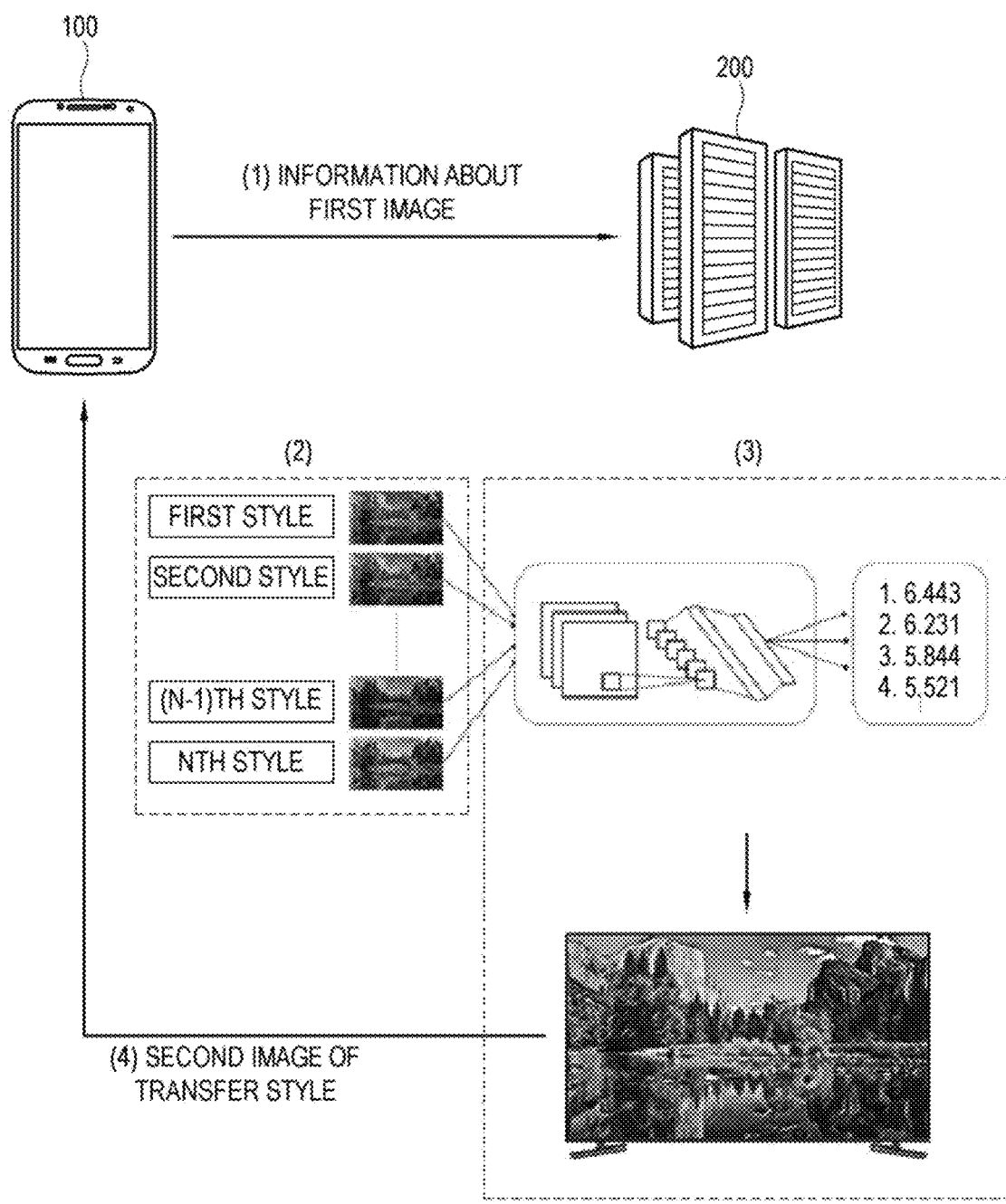
FIG. 1 is a schematic diagram showing operation of a system including a display apparatus 100 and a server 200 according to an embodiment of the disclosure.

Below, embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the present inventive concept and the key configurations and functions. In the following descriptions, details about publicly known functions or features will be omitted to avoid obscuring descriptions of the embodiments.

In the following descriptions, the terms 'first', 'second', etc. are used to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be modularized into at least one processor. Further, in the following embodiments, at least one among a plurality of elements refer to not only all of the plurality of elements but also each element among the plurality of elements excluding the other elements or a combination thereof. Further, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance. For example, the phrase of "the processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

FIG. 1 is a schematic diagram showing operation of a system including a display apparatus 100 and a server 200 according to an embodiment of the disclosure.

The display apparatus 100 according to an embodiment of the disclosure may be actualized by a smart phone, for example. Further, the display apparatus 100 may be actualized by a television (TV), an electronic frame, a digital billboard, a large format display (LFD), a digital signage, a tablet computer, a mobile phone, a smart watch, a head-mounted display or the like wearable device, a computer, a multimedia player, a set-top box, a smart refrigerator, or the like apparatus capable of outputting an image based content. However, the display apparatus 100 according to the embodiments of the disclosure is not limited to these examples, but may include any apparatus capable of displaying an image. Likewise, the server 200 according to an embodiment of the disclosure may also be actualized by any apparatus capable of processing an image and communicating with the display apparatus 100.

Further, the disclosure may be actualized by a single apparatus that implements the functions of both the display apparatus 100 and the server 200 without separating the display apparatus 100 and the server 200. However, for convenience of description, embodiments will be described based on a premise that the display apparatus 100 and the server 200 are configured as separate apparatuses.

Referring to FIG. 1, operation of the display apparatus 100 and the server 200 according to an embodiment of the disclosure will be described as follows. The display apparatus 100 transmits information about a first image or a base image, to which a style transfer service will be applied, to the server 200. The server 200 receives the information about the first image and generates a second image, which is obtained by transferring or converting a characteristic of the first image (hereinafter, referred to as a 'second image of a transfer style'), i.e. generates a second image expected to be preferred by a user, thereby transmitting the generated second image to the display apparatus 100. The display apparatus 100 receives and displays the second image to which the transfer style is applied, thereby providing the second image to a user. Detailed descriptions about application of the transfer style to the base image are described herein below.

Figure 2:
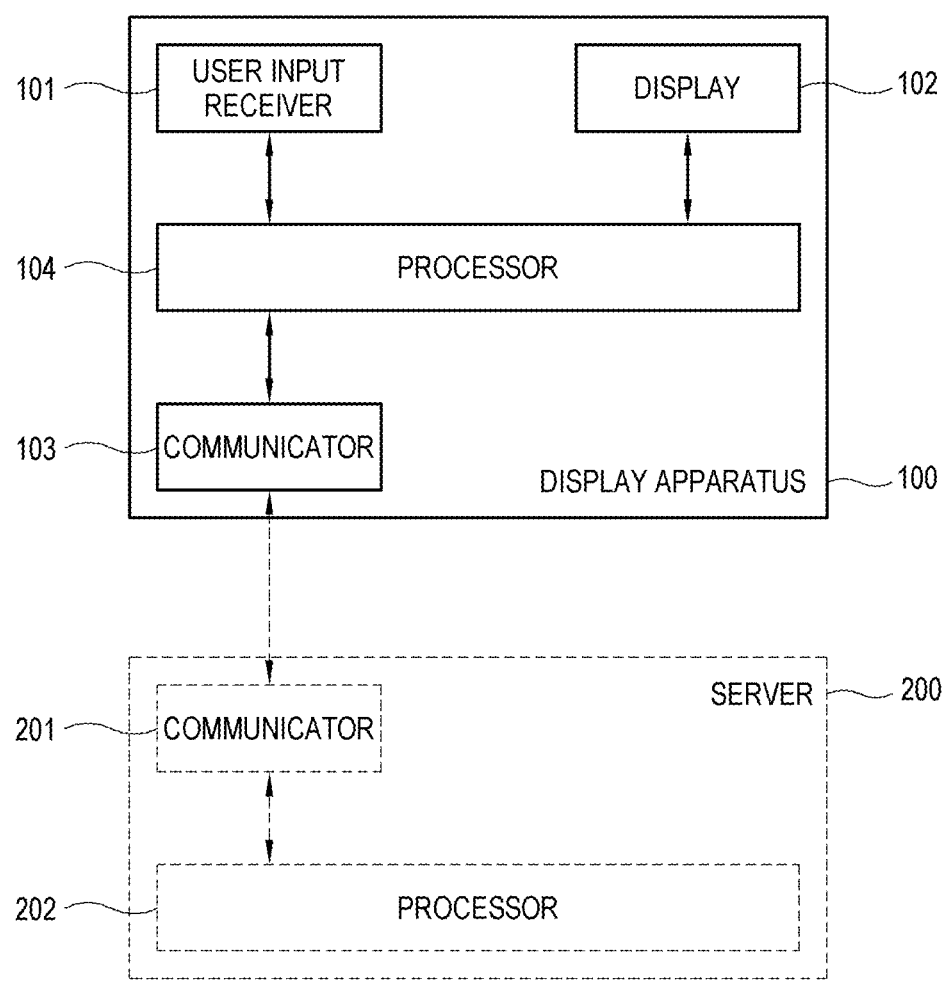
FIG. 2 is a block diagram of the display apparatus 100 and the server 200 according to an embodiment of the disclosure.

FIG. 2 is a block diagram of a display apparatus 100 and a server 200 according to an embodiment of the disclosure. The configurations of the display apparatus 100 and the server 200 shown in FIG. 2 are examples, and the display apparatus 100 and the server 200 may be actualized to have other configurations including additional or alternative components. In other words, the display apparatus 100 and the server 200 according to an embodiment of the disclosure may be actualized including other elements in addition to the elements shown in FIG. 2, or excluding some elements shown in FIG. 2. According to an embodiment of the disclosure, the configurations and functions thereof may be realized by at least one of hardware and/or software, and may be actualized by a circuit or a chip.

The display apparatus 100 according to an embodiment of the disclosure includes a user input receiver 101, a display 102, a communicator 103 and a processor 104.

The user input receiver 101 receives a user input command input by a user and transmits a signal corresponding to the input command to the processor 104. For example, the user input receiver 101 may receive a touch input when the display 102 is touch sensitive or a remote input using a signal received from a remote controller that controls the display apparatus 100, and transmits the corresponding input to the processor 104.

The display 102 may display an image corresponding to an image signal received by the display apparatus 100. The display 102 may be actualized by various display types such as liquid crystal, plasma, a light emitting diode (LED), an organic light emitting diode (OLED), a surface-conduction electron-emitter, a carbon nano-tube, nano-crystal, etc. When the display 102 is the liquid crystal, the display includes a liquid crystal display (LCD) panel, a backlight unit for emitting light to the LCD panel, a panel driver for driving the LCD panel, etc. Alternatively, the display 102 may be actualized by a self-emissive OLED panel without the backlight unit.

The communicator 103 may communicate with the server 200 or any other apparatus. The communicator 103 may perform wired or wireless communication. Therefore, the communicator 103 may be actualized to implement various communication methods as well as a connection portion including a connector or terminal for wired or wireless connection. For example, the communicator 103 may be configured to perform one or more communications among Wi-Fi, Wi-Fi direct, Ethernet, Bluetooth, Bluetooth low energy (BLE), serial port profile (SPP), ZigBee, infrared (IR) communication, radio control, ultra-wide band (UWB), wireless universal serial bus (USB), and near field communication (NFC).

The processor 104 may process a signal received by the user input receiver 101 to interpret the user input. Further, the processor 104 may process an image based on an image signal, which may be received by the communicator 103. The processor 104 may perform any image processing. The image processing performed in the processor 104 may include de-multiplexing to dividing an input stream into sub streams such as video, audio and appended data, decoding data corresponding to an image format of an image stream, de-interlacing to convert an interlaced-type image stream into a progressive-type image stream, scaling to adjust an image stream to have a preset resolution, noise reduction of an image signal or image stream to improve image quality, detail enhancement, frame refresh rate conversion, etc.

The processor 104 may control to operate general elements of the display apparatus 100. The processor 104 may execute a control program (or computer-executable instructions) to perform control operations of the display apparatus 100. In this case, the display apparatus 100 may further include a nonvolatile memory in which the control program is stored and/or installed, and a volatile memory to which at least a part of the installed control program is loaded. Further, such a control program may be stored in other electronic devices as well as the display apparatus 100.

The control program may include a program(s) actualized by at least one among a basic input/output system (BIOS), a device driver, an operating system, firmware, a platform, and an application program (or an application). According to an embodiment, the application program may be installed or stored in the display apparatus 100 when the display apparatus 100 is manufactured, or may be installed in the display apparatus 100 based on data of an application program received from an external source such that the application is installed by a user of the display apparatus 100. The data of the application program may for example be downloaded from an external server such as an application server to the display apparatus 100, but the external source is not limited thereto. For convenience, the operation performed by executing the control program in the processor 104 according to an embodiment of the disclosure may be described below as the operation of the processor 104.

The processor 104 may for example control the user input receiver 101 to receive a user input. The processor 104 may also process an image signal that is received from a source and control the display 102 to display an image corresponding to the image signal. The display apparatus 100 shown in FIG. 2 is actualized to include at least one processor 102 configured to perform both the process and the control, but this is merely an example. However, the display apparatus 100 may be actualized to additionally include a controller separately from the processor, such that image processing and control may be respectively executed by one or more components.

The display apparatus 100 according to an embodiment of the disclosure may further include a storage or memory.

The storage may be configured to store various pieces of data under the process and control of the processor 104. The storage may be accessed by the processor 104 to perform reading, writing, modifying, deleting, updating, etc. to data. The storage may include a nonvolatile memory such as a flash memory, a hard disc drive (HDD), a solid state drive (SSD), etc. to retain data regardless of whether system power is supplied to the display apparatus 100. Further, the storage may include a volatile memory such as a buffer, a random access memory (RAM), etc. to load data to be processed by the processor 104.

The server 200 according to an embodiment of the disclosure includes a communicator 201 and a processor 202. The communicator 201 and the processor 202 of the server 200 are equivalent to the communicator 103 and the processor 104 of the display apparatus 100, and thus redundant descriptions thereof will be avoided. Of course, additional components of the server may include memory, user interfaces, and other components similar to the components of the display apparatus 100.

Figure 3:
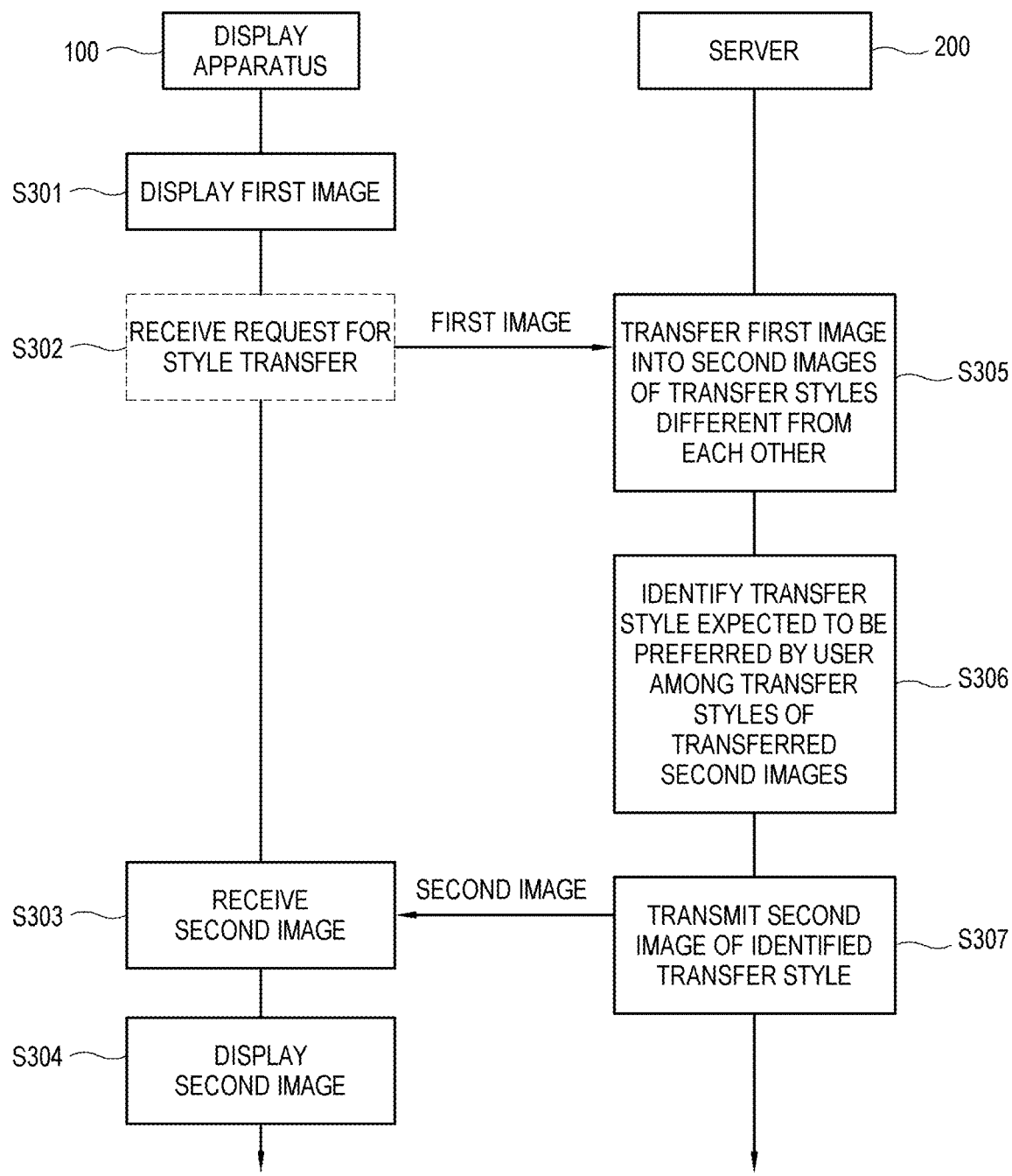
FIG. 3 is a flowchart showing operation of the display apparatus 100 and the server 200 according to an embodiment of the disclosure.

FIG. 3 is a flowchart showing operation of the display apparatus 100 and the server 200 according to an embodiment of the disclosure.

The processor 104 of the display apparatus 100 according to an embodiment of the disclosure controls to display a first image, which is selected based on a user input received through the user input receiver 101, on the display 102 (S301). In other words, when a user of the display apparatus 100 selects the first image while using the display apparatus 100, the processor 104 causes the first image to be displayed on the display 102. Alternatively, at least one image is displayed on the display 102, and then a user may select the first image from among the at least one image. In the disclosure the 'first image' refers to an image to which a style transfer service will be applied. Further, the 'second image' refers to an image generated or obtained by applying the style transfer service to the first image.

Then, the processor 104 of the display apparatus 100 receives a user input that requests for executing a style transfer service or a transfer style recommendation service (S302), and transmits the first image or information about the first image for describing the content, location, and/or the format of the first image to the server 200 in response to the received input. Alternatively, the style transfer service or the transfer style recommendation service may be executed in response to generation of a preset event, or may be automatically executed as the first image is displayed. In other words, the first image or the information about the first image may be transmitted in response to generation of a predetermined event or the display or selection of the first image even though a user input is not separately received.

The processor 202 of the server 200, which is requested to execute the style transfer service or the transfer style recommendation service by the input or the like of a user who is using the display apparatus 100, receives the first image and/or information about the first image selected by the user from the display apparatus 100 (S302, see (1) in FIG. 1). The processor 202 of the server 200 receives the first image or the information about the first image, and converts the first image into the second images of a plurality of transfer styles having different image characteristics of the first image (S305, see (2) in FIG. 1). To convert the first image into the second image of the transfer style, various techniques related to the image style transfer may be used, such as a method of using convolutional neural networks (CNN), a method of using a generative adversarial network (GAN), etc.

The processor 202 of the server 200 identifies the transfer style, which is expected to be preferred by a user, among a plurality of transfer styles for the transferred second image (S306, see (3) in FIG. 1). Details of the identification method will be described later. Then, the processor 202 of the server 200 transmits the second image of the identified transfer style to the display apparatus 100 (S307, see (4) in FIG. 1).

Thus, the processor 104 of the display apparatus 100 obtains and/or receives the second image, which corresponds to the transfer style expected to be preferred by a user, among the plurality of image transfer styles different in characteristic of the first image, from the server 200 through the communicator 103 (S303). Here, the 'characteristic of the image' refer to the features or styles of the image distinguished from the content of the image, and may for example include the color, chroma, brightness, contrast, outline presence, outline type and thickness, brush type and thickness, texture size, etc. of the image. Therefore, 'the plurality of second image transfer styles different in characteristic of the first image' refers to a plurality of transfer styles which are applied to the first image targeted for the style transfer service to generate the second images different in styles or image characteristics from each other. For example, the transfer style may include a style corresponding the general brush of a specific painter (for example, a Picasso style, a Van Gogh style, a Monet style), a style corresponding to the brush of a certain greatest work, a style corresponding to a specific art technique (for example, an oil painting style, a watercolor style, a print style, the styles described in the background of the disclosure), etc. Further, the second image of the transfer style 'expected to be preferred by a user' refers to a second image generated as a result of applying a predetermined transfer style and expected to be preferred by a user. The identification of the second image is performed in the server 200 or the display apparatus 100. Details of the identification will be described later.

In other words, the processor 104 of the display apparatus 100 obtains the second image of the transfer style expected to be preferred by a user, which is recommended by the server 200, among the second images generated by applying the different transfer styles (i.e. the second images of the transfer styles) to the first image, i.e. the image targeted for the style transfer.

The processor 104 obtains at least one second image of the transfer style expected to be preferred by a user through the foregoing process, and displays at least one obtained second image on the display 102 (S304).

Thus, when a user uses the style transfer service, the display apparatus 100 automatically recommends at least one image of a transfer style expected to be preferred by the user, thereby improving user convenience and service satisfaction.

Meanwhile, the second image transferred from the server 200 to the display apparatus 100 refers to a second image generated by applying a transfer style, which is recommended as expected to be preferred by a user among the plurality of transfer styles, to the first image, i.e. refers to a recommended candidate image. Here, there may be given a single or a plurality of recommended candidate images, i.e. second images.

Further, a user may select whether to accept one among the recommended candidate images. For example, when a single second image is displayed on the display apparatus 100 as the recommended candidate image, a user may select whether to finally accept the recommended second image or request another recommended image. On the other hand, when a plurality of recommended candidate image, i.e. second images are provided, a user of the display apparatus 100 may select whether to select one image and finally accept the selected image or to request for another recommended image.

Until a user selects an image from among the recommended candidate images, i.e. among the second images, the processor 104 of the display apparatus 100 may display the second images in the form of thumbnail images. In other words, the processor 104 may preferentially receive an image having a resolution corresponding to a thumbnail image of the second image from the server 200 and display the received image on the display 102 until a user selects an image from among at least one second image, and then receive an image having the original resolution of the second image and display the received image on the display 102 after the second image to be finally accepted is identified in response to a user input of selecting one of at least one second image.

Below, operation of the display apparatus 100 according to an embodiment of the disclosure, described above with reference to FIGS. 4 and 9, will be described based on user interfaces (UI) given by way of example. However, the UIs shown in FIGS. 4 to 9 are merely examples, and a screen configuration, a menu screen, a method of displaying the second image, etc. are not limited to these examples.

Figure 4:
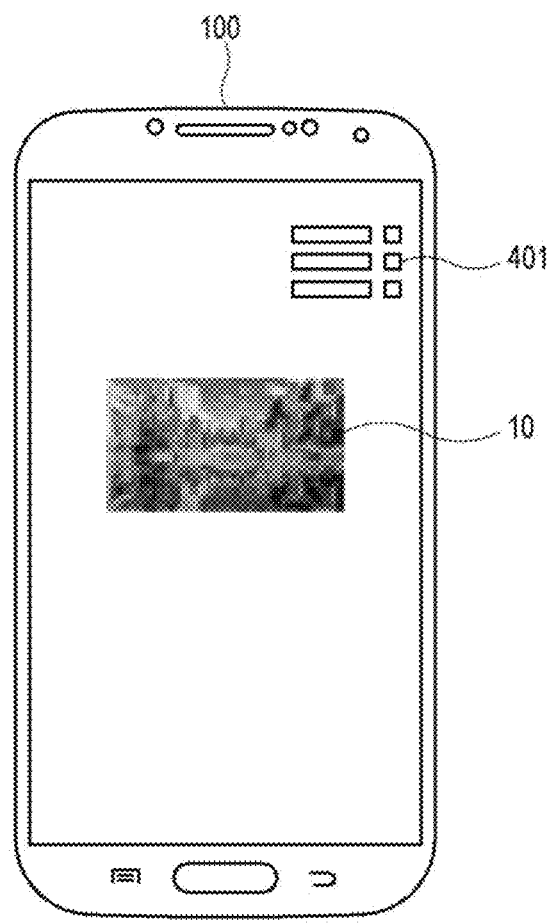
FIGS. 4, 5, 6, 7, 8, and 9 are diagrams showing examples of a user interface (UI) based on operation of the display apparatus 100 according to an embodiment of the disclosure.

The processor 104 of the display apparatus 100 may control the display apparatus 100 to display a first image 10 on the display 102 as shown in FIG. 4. Display of a menu UI 401 may be executed by selection of a user. In other words, the processor 104 may display the first image 10, which is selected in response to a user input received through the user input receiver 101, on the display 102. The processor 104 may display the first image 10 together with the menu UI 401 through which an input of a menu item display command related to the first image is received.

Figure 5:
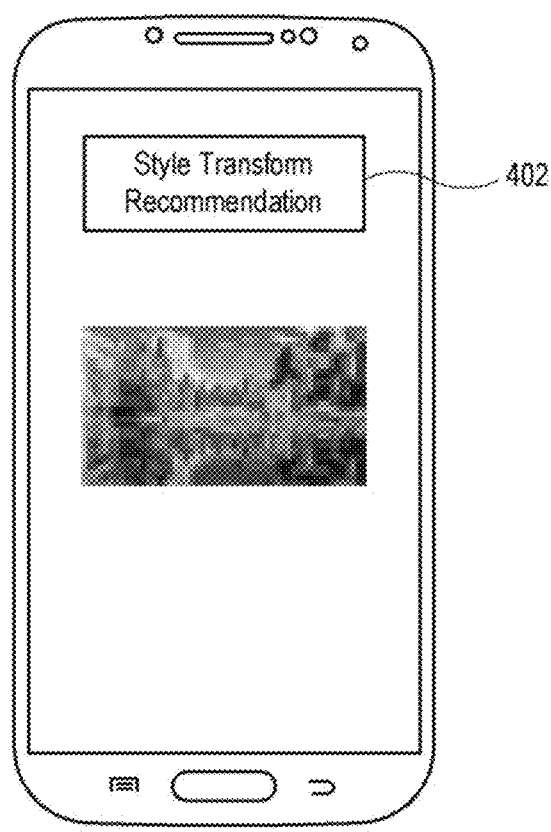

Based on reception of a user command to select the menu UI 401, the processor 104 may display a second menu UI 402 to receive a user command for executing a style transfer recommendation service, as shown in FIG. 5.

Figure 6:
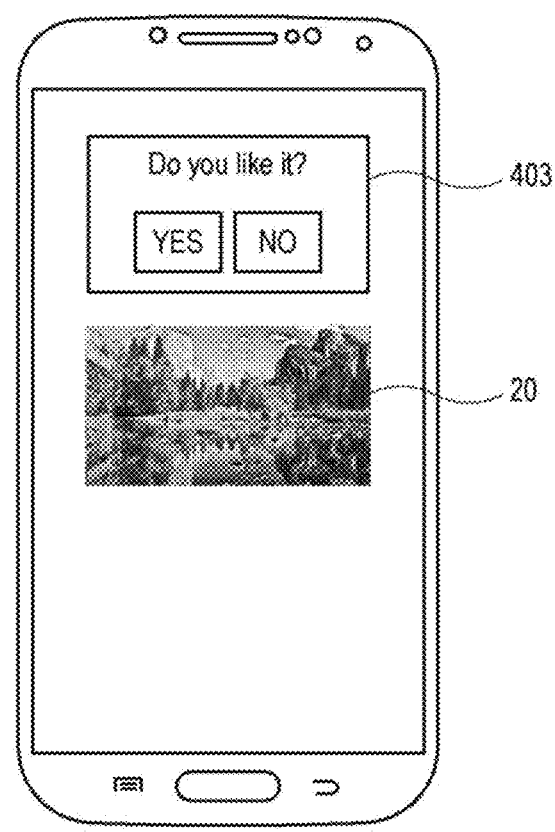
Figure 7:
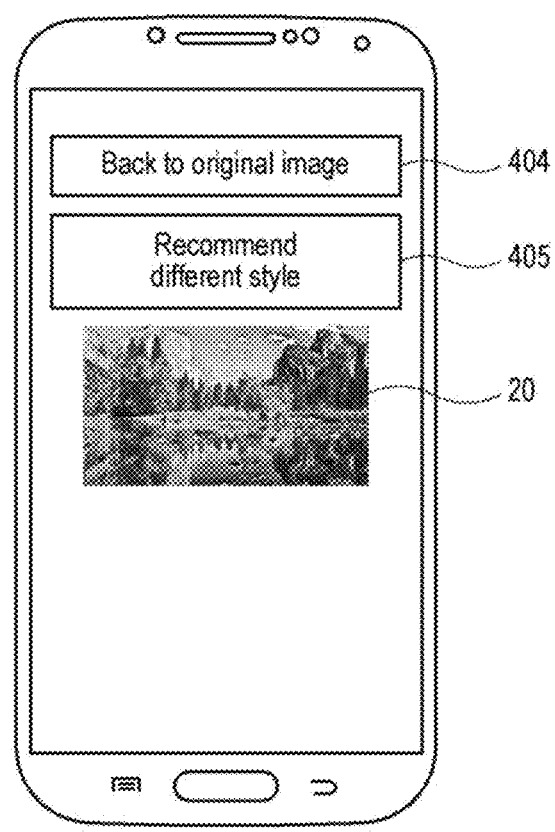

Based on reception of a user command to select the second menu UI 402, the processor 104 may obtain a second image 20 of the transfer style, which is expected to be preferred by a user among the plurality of second image transfer styles different in the characteristic of the first image 10, from the server 200, and display the obtained second image 20 on the display 102 as shown in FIG. 6. FIG. 6 shows an example that only the second image 20 is displayed. Alternatively, the processor 104 may display the second image 20 together with the first image 10.

Because the displayed second image 20 is the second image of the recommended transfer style, the processor 104 may display a third menu UI 403 through which a user can select whether to finally accept the displayed second image 20. In this regard, FIG. 6 shows an example of an interface that requests user input either confirming the recommended image 20 or disapproving of the recommended image 20.

Based on reception of a user command to finally select the displayed second image 20, the processor 104 may display the second image 20 selected instead of the first image 10. While displaying the second image 20 selected instead of the first image 10, the processor 104 may display a UI 404 for canceling the style transfer and returning back to the original first image 10 and/or a UI 405 for receiving a user command to request for recommendation of another image of a different transfer style.

Figure 8:
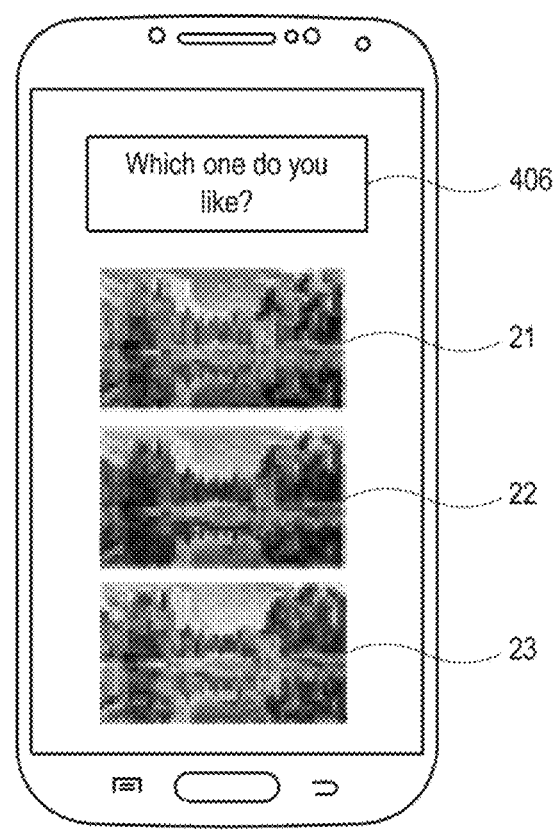

Meanwhile, FIGS. 4 to 7 show examples that the second image 20 of only one transfer style is recommended. Alternatively, as described above, the second images 20 may be recommended corresponding to a plurality of transfer styles. For example, in the state that the second menu UI 402 for receiving a user command to execute the style transfer recommendation service is displayed on the display 102 as shown in FIG. 5, when a user command of selecting the second menu UI 402 is received, the processor 104 may obtain second images 21~23 of a plurality of transfer styles expected to be preferred by a user from among the plurality of second images of transfer styles different in the charac-teristic of the first image 10, from the sever 200. The recommended images 21-23 may be displayed on the display 102 as shown in FIG. 8. Along with the display of the second images 21~23, the processor 104 may also display a fourth menu UI 406 through which one among the plurality of second images 21~23 displayed on the screen can be selected, thereby allowing a user to select one among the plurality of recommended second images 21~23.

Figure 9:
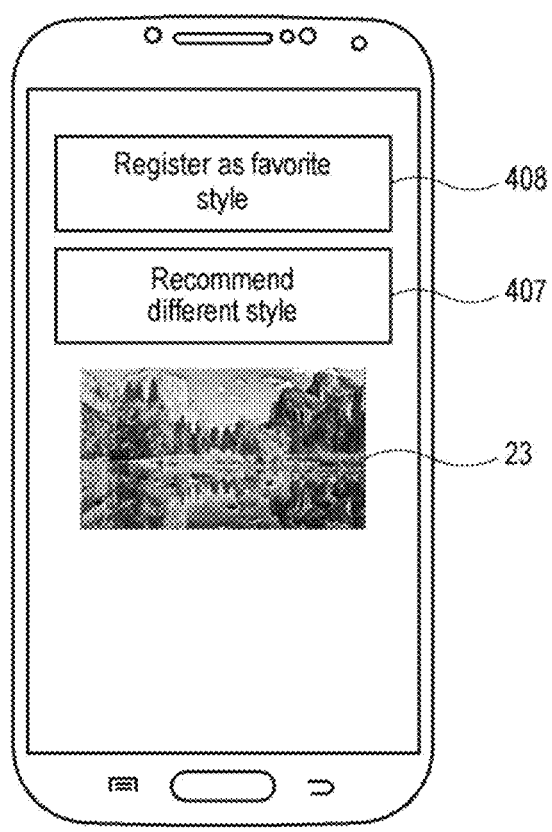

Referring to FIG. 9, a user input of selecting one among the plurality of second images 21~23 displayed on the screen is received, the processor 104 may display a second image 23 selected instead of the first image 10 based on the user input. Accordingly, the processor 104 may display a UI 407 to receive a user command that makes a request for another recommendation transfer style. Further, the processor 104 may display a UI 408 through which the transfer style of the second image 23 finally accepted and currently displayed on the display 102 among the plurality of recommended candidate images can be registered as a favorite style of the user. The transfer style registered as the favorite style of the user may be additionally taken into account later when transfer style expected to be preferred by a user is identified for another first or base image.

Below, detailed methods of identifying a transfer style expected to be preferred by a user according to embodiments will be described with reference to FIGS. 10 to 15.

Figure 10:
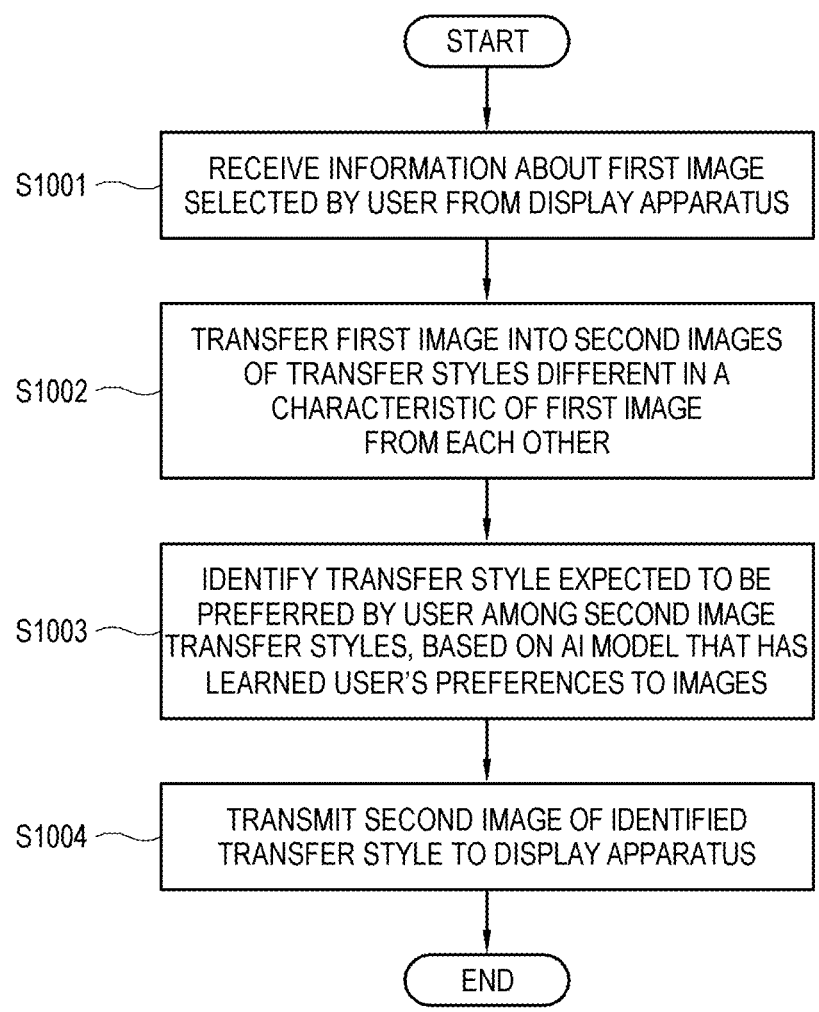
FIGS. 10, 11, 12, 13, 14, and 15 are diagrams showing various examples of identifying a transfer style expected to be preferred by a user in the server 200 according to an embodiment of the disclosure.

FIG. 10 is a flowchart showing operation of the server 200 according to an embodiment of the disclosure.

When a user who is using the display apparatus 100 selects the first image through the user input receiver 101, the processor 202 of the server 200 receives information about the first image selected by a user from the display apparatus 100 (S1001). As described above with reference to FIG. 3, the processor 202 of the server 200 may receive the first image from the display apparatus 100.

After receiving the information about the first image or the first image, the processor 202 of the server 200 converts the first image to the plurality of second image transfer styles different in the characteristic of the first image (S1002).

Then, based on an artificial intelligence (AI) model that has learned a plurality of user preferences, for example according to training on a plurality of images, the processor 202 identifies transfer style expected to be preferred by a user among the plurality of second image transfer styles (S1003), and transmits the second image of the identified transfer style to the display apparatus 100 (S1004).

Figure 11:
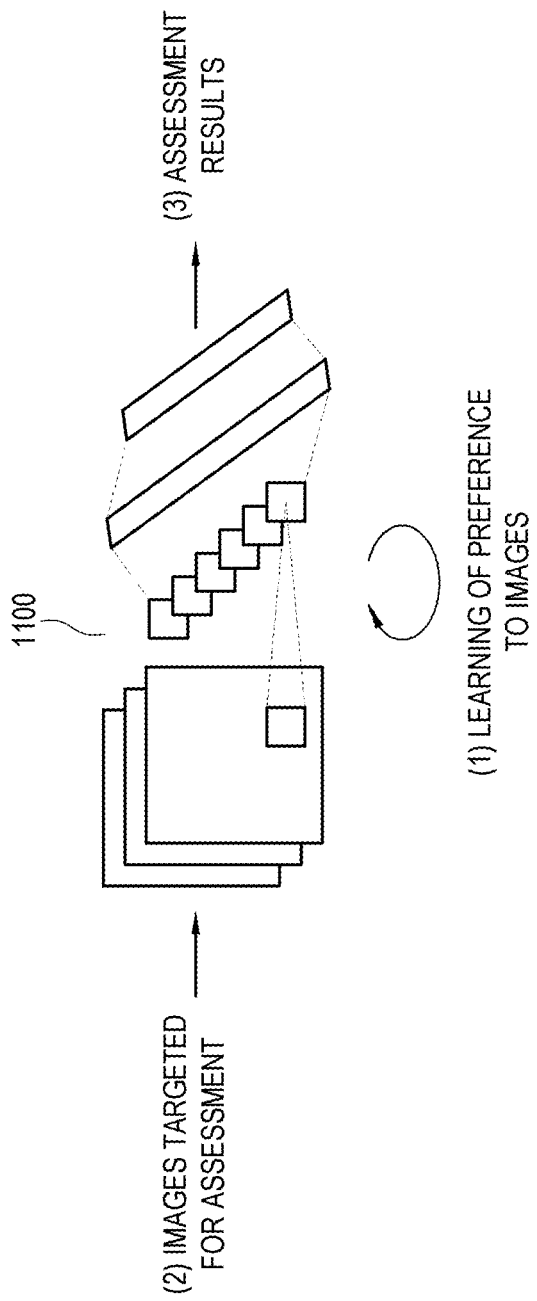

Here, the AI model, which has learned a plurality of user preferences according to a plurality of images, refers to an AI model that has learned data or the like in which general preferences to a plurality of images are scored. When a certain image is input to the AI model, of which learning is completed, the AI model may infer a preference value, expected to be given to the certain image by users, from a learning result, and output the preference value. In other words, as shown in FIG. 11, when the AI model 1100 is trained to learn a plurality of user preferences to a plurality of images (see (1) in FIG. 11) and then an image to be identified is given as an input value to the AI model 1100 (see (2) in FIG. 11), the AI model 1100 may infer a preference or an identification result, which is expected to be given by a plurality of users to the input image targeted for the identification, and output the preference value (see (3) in FIG. 11). Therefore, the first image is converted to the second images corresponding to the plurality of transfer styles different in the characteristic of the first image, and then the AI model may infer a preference score expected to be given by a plurality of users to each transferred second image, thereby selecting and recommending one or a plurality of second image transfer styles to a user who is using the display apparatus 100 based on the inferred value (for example, in descending order of inferred scores).

Such an AI model may be actualized by applying deep learning, in particular, a deep learning technique or the like based on convolutional neural network (CNN), to an artificial intelligence neural network, e.g. a deep neural network, or the like structure, but the structure and techniques are not limited to these examples.

As an example of the AI model that has learned the plurality of user preferences with regard to the plurality of images, there is neural image assessment (NIMA) that has learned a set of aesthetic visual analysis (AVA) data with scores given to 255,000 images by 200 people. However, the AI model of the disclosure is not limited to this example. Besides, any model such as a peak signal-to-noise ratio (PSNR), a structural similarity (SSIM) index, or the like model for quantitatively assessing a predetermined image.

Thus, an automatic recommendation of a transfer style expected to be preferred by a user may be reliably determined.

In the foregoing AI model, the plurality of user preferences to the plurality of images is used as the learning data by way of example. However, there are no limits to the data that the AI model of the disclosure can learn. For example, when there is one user of the display apparatus 100, and the amount of data about preferences given to a plurality of images by the one user is enough to be learned by the AI model, the AI model of the disclosure may be a model that learns the data as the learning data.

Thus, the transfer style is recommended by the AI model that has learned the preferences of a specific user who is using the display apparatus 100, thereby improving reliability on an automatic recommendation of a transfer style expected to be preferred by a user.

Meanwhile, to speed up the recommendation service, the server 200 according to an embodiment of the disclosure may narrow the range of the transfer style targeted for the assessment instead of transferring the first image into the second images corresponding to all the transfer styles supportable in the style transfer service and then identifying transfer style expected to be preferred by a user among all the transfer styles.

As an example of the method of narrowing the range of the transfer styles targeted for the assessment, the processor 202 of the server 200 according to an embodiment of the disclosure may identify a category of the first image and then limit the range of the transfer style targeted for the assessment to the transfer style corresponding to the identified category. Specifically, the processor 202 of the server 200 may identify the category of the transfer style preferred by a user based on information about a favorite style of the user, a history of the user selecting the transfer style, etc. and then limit the range of the transfer style targeted for the assessment to the transfer style corresponding to the identified category.

Figure 12:
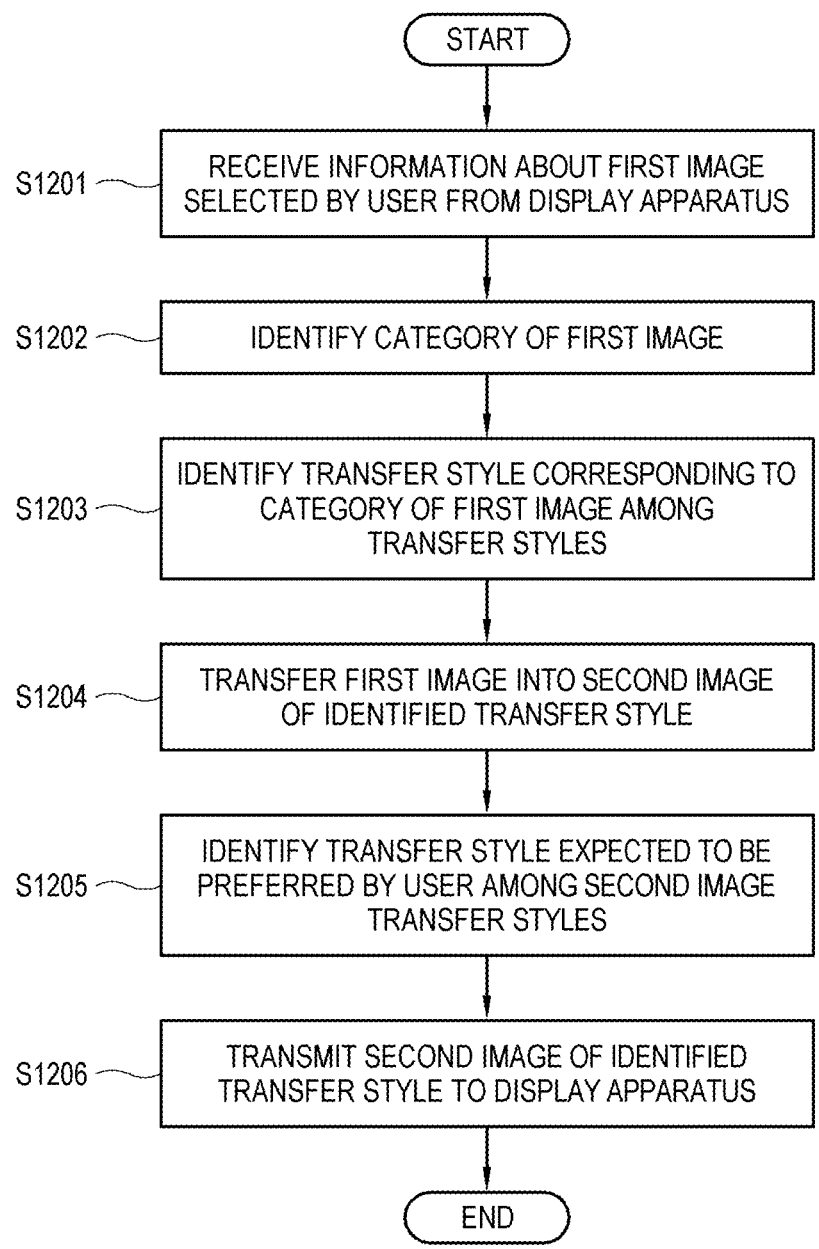

Referring to FIG. 12, detailed operation of the server 200 according to this embodiment are as follows: the processor 202 of the server 200 receives information about the first image selected by a user from the display apparatus 100 (S1201), and identifies the category of the first image (S1202). Then, the processor 202 identifies at least one transfer style corresponding to the category of the first image among the plurality of transfer styles (S1203), converts the first image into the second images of the identified transfer styles different in the characteristic of the first image (S1204), identifies a transfer style expected to be preferred by a user among the plurality of second image transfer styles based on the transferred second images (S1205), and transmits the second image of the identified transfer style to the display apparatus (S1206). In other words, the first image is converted into the second images with regard to the transfer styles corresponding to the category of the first image, and then transfer style expected to be preferred by a user is identified among the transfer styles for the second images corresponding to the category.

Figure 13:
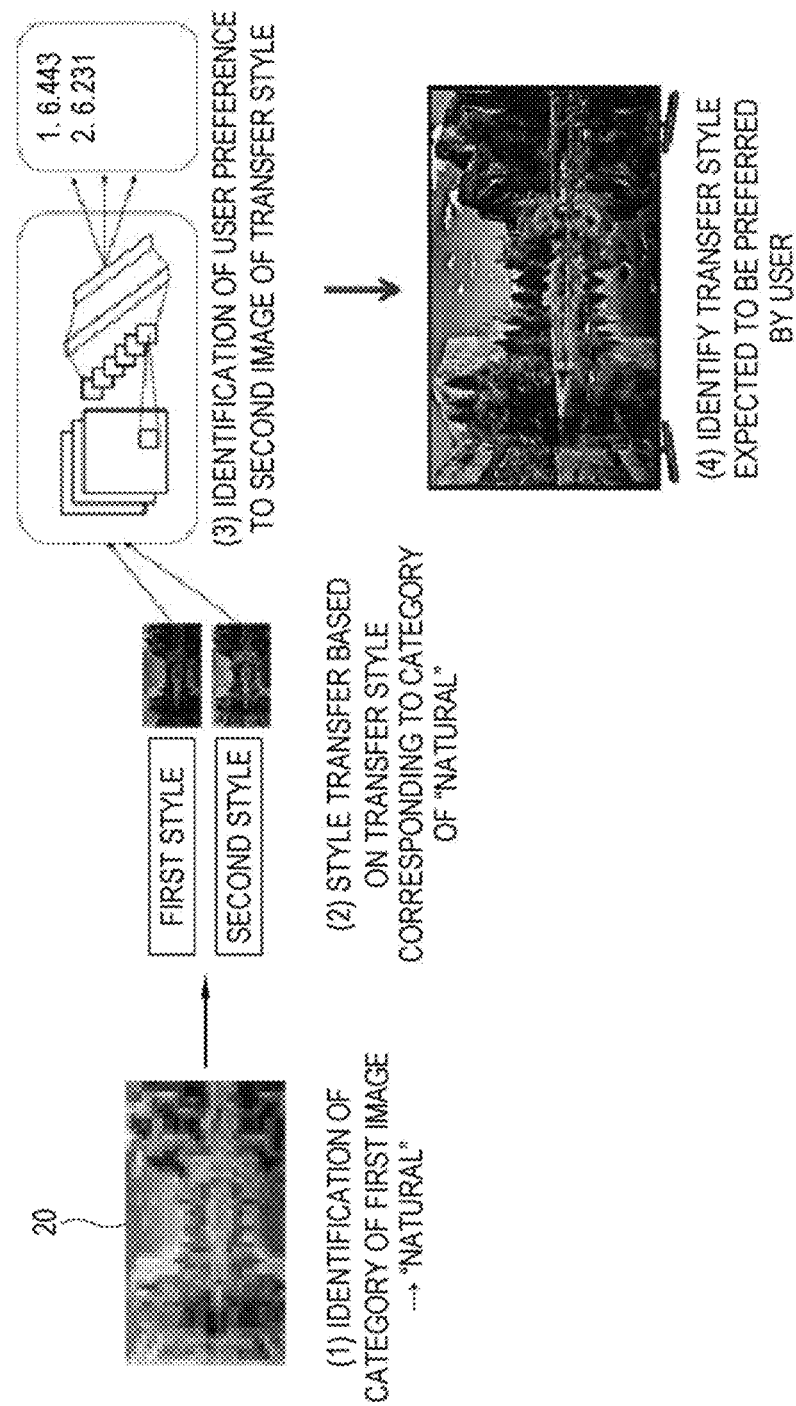

Referring to FIG. 13, a detailed example is as follows: the processor 202 of the server 200 identifies the category of the first image (see (1) in FIG. 13). For example, when the category to which the first image 20 belongs to is 'natural', the processor 202 identifies the transfer style corresponding to the category of the first image among the plurality of transfer styles, i.e. corresponding to the category of 'natural' (see (2) in FIG. 13). For example, when a first style and a second style are identified as the transfer styles corresponding to the category of 'natural' among the plurality of transfer styles, the processor 202 generates the second images by applying the first style and the second style to the first image to convert image the characteristic of the first image, and infers a user preference to each of the second images (see (3) in FIG. 13). Then, the transfer style expected to be preferred by a user is identified based on a user preference inferred with respect to each of the second images (see (4) in FIG. 13).

Thus, it is possible to improve the implementation of the transfer style recommendation service.

To further improve the reliability on the transfer style recommendation service, the processor 202 of the server 200 may refer to information about a user's favorite style. A user of the display apparatus 100, who receives a recommendation of the transfer styles as described above with reference to FIG. 9 and the like, may select one of the recommended transfer styles, and register the selected transfer style as the favorite style of the user. Alternatively, the processor 104 of the display apparatus 100 may register the selected transfer style as the favorite style of the user in response to a user input of selecting one of the recommended transfer styles, without any separate input for making a request for registering the selected transfer style as the favorite style of the user.

In this case, the processor 202 of the server 200 refers to information about the foregoing registered user favorite styles while providing the transfer style recommendation service, thereby enhancing the reliability on the transfer style recommendation service. In other words, information about the transfer styles that have been actually preferred and selected by a user, for example, information about a history of selecting the transfer style, may be used to further improve the reliability on the transfer style recommendation service. When the recommendation service is given based on the AI model that has learned the plurality of user preferences to the plurality of images without referring to the information about the user favorite style information, the transfer style is recommended based on inference that is not specialized for a user of the display apparatus 100. On the other hand, in this embodiment, the transfer style is recommended by further referring to the information specialized for a user, and therefore the reliability on the recommendation service is improved.

Figure 14:
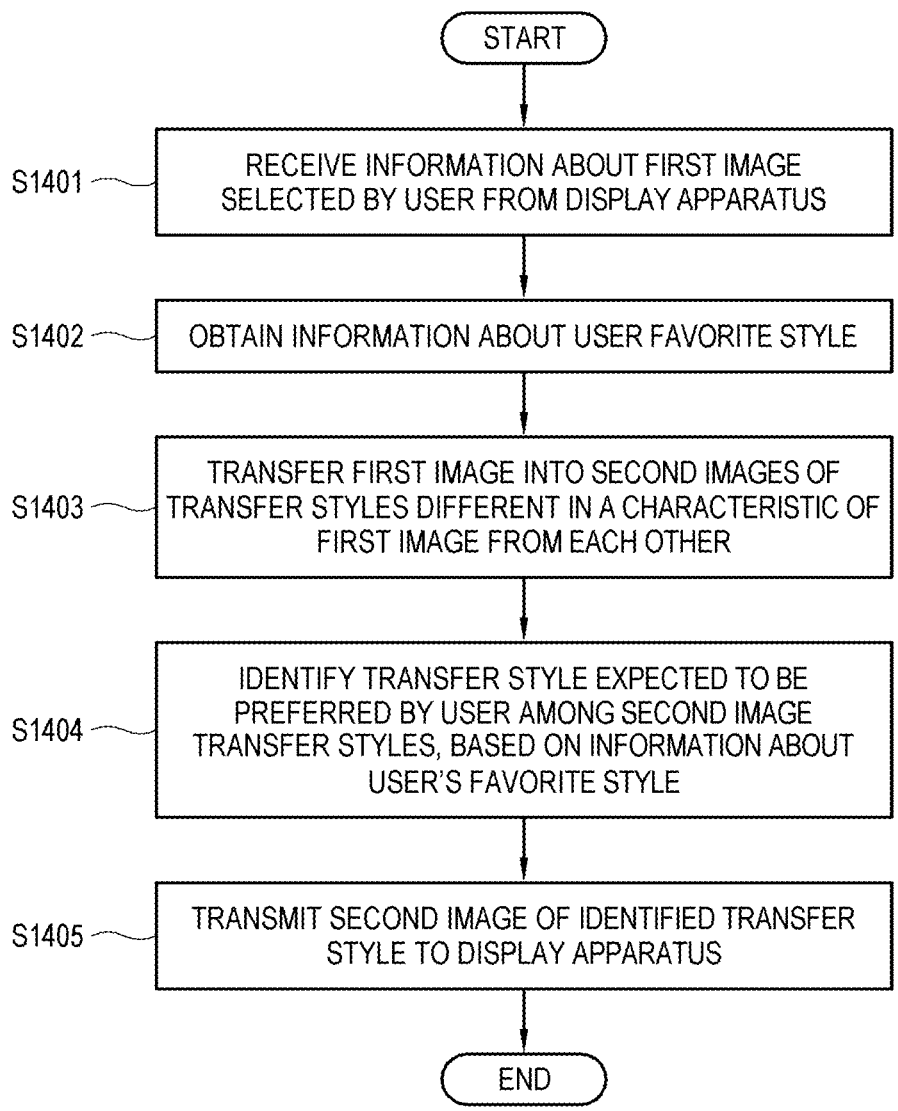

Referring to FIG. 14, detailed operations in this case are as follows. The processor 202 of the server 200 receives information about the first image selected by a user from the display apparatus (S1401), obtains the information about the favorite style of the user (S1402), converts the first image into the second images corresponding to the plurality of transfer styles different in the characteristic of the first image (S1403), identifies at least one transfer style expected to be preferred by a user among the plurality of second mage transfer styles, based on the obtained information about the user favorite style (S1404), and transmits at least one second image of the identified transfer style to the display apparatus (S1405).

Thus, the reliability on the transfer style recommendation service is further improved.

Meanwhile, as another example of the method of narrowing the range of the transfer styles targeted for the assessment, the processor 202 of the server 200 according to an embodiment of the disclosure makes a primary recommendation within a range of some transfer styles among the plurality of supportable transfer styles, and makes a secondary recommendation within a range of the other transfer styles according to whether a user accepts the primary recommendation. In addition to the primary recommendation and the secondary recommendation, there may be a tertiary recommendation, a quaternary recommendation, and so on. However, for convenience of description, descriptions will be made up to the secondary recommendation.

Figure 15:
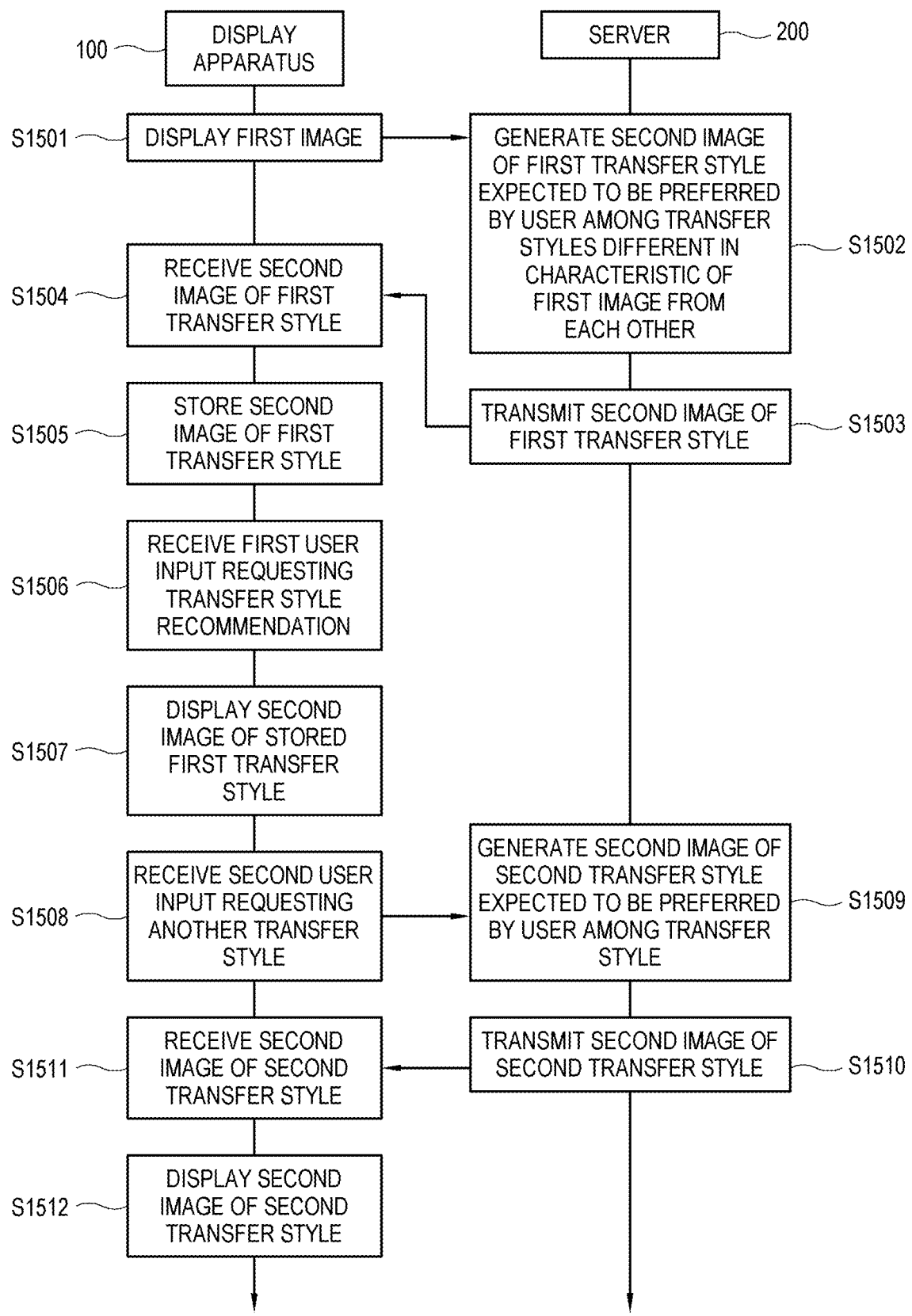

This embodiment will be described in more detail with reference to FIG. 15.

When the first image is displayed on the display 102 while a user of the display apparatus 100 is using the display apparatus 100 (S1501), the processor 202 of the server 200 may make the primary recommendation with regard to the first image, and the display apparatus 100 may store the result of making the primary recommendation. Specifically, the processor 202 of the server 200 generates the second image corresponding to first transfer style expected to be preferred by a user among the plurality of transfer styles different in the characteristic of the first image (S1502), and transmits the generated second image to the display apparatus 100 (S1503). The processor 104 of the display apparatus 100 receives the second image corresponding to first transfer style from the server 200 (S1504), and stores the received second image in the storage (S1505). In response to a first user input that makes a request for a recommendation of the transfer styles (S1506), the processor 104 of the display apparatus 100 displays the stored second image of first transfer style (S1507). The second image of the first transfer style refers to an image generated by a style based on the primary recommendation for the first image, and a user may use the recommendation service in such a manner of selecting and accepting one of the second images. In other words, the first transfer style may include a plurality of transfer styles. Likewise, a similar processing may be repeated for the second transfer style.

However, when a user refuses the recommendation for reasons that a desired image is not present among the second images displayed corresponding to the first transfer styles, etc., the user may again request a recommendation of other styles. Specifically, in response to a second user input that requests for additional transfer styles (S1508), the processor 104 of the display apparatus 100 makes a request for the secondary recommendation to the server 200, and the processor 202 of the server 200 receives the request and generates the second image of second transfer style expected to be preferred by a user among the plurality of transfer styles (S1509), thereby transmitting the generated second image to the display apparatus 100 (S1510). The processor 104 of the display apparatus 100 receives the second image of second transfer style (S1511), and displays the received second image of second transfer style on the display 102 (S1512), thereby allowing a user to finally select whether to accept the second image.

In the foregoing embodiment, the server 200 makes a recommendation of transfer styles and the display apparatus 100 previously stores a list of transfer styles before receiving the first user input that requests the transfer style recommendation. In other words, the primary recommendation is previously made before a user makes a request. However, the disclosure is not limited to this embodiment. Alternatively, the primary recommendation of the transfer style may be determined after a user input that makes a request for the transfer style recommendation.

Further, the range of some transfer styles, which provides a background of the primary recommendation, may be dynamically varied depending on a user's selection history. For example, when a user does not accept the primary recommendation of the second image but finally accepts the secondary recommendation of the second image, the processor 202 of the server 200 may reflect the corresponding the user selection history to add the transfer style of the second image finally accepted by the user to the range of the primary recommendation target transfer styles or to change one of the existing primary recommendation target transfer styles into the transfer style of the second image finally accepted by the user.

Meanwhile, the foregoing embodiment describes that the recommendation service is carried out step by step as divided into the primary recommendation and the secondary recommendation, and both the primary recommendation and the secondary recommendation are implemented in the server 200. However, the disclosure is not limited to this embodiment. Alternatively, the secondary recommendation may be implemented in the server 200, and the primary recommendation may be implemented in the display apparatus 100.

For example, in the case where the AI model that has learned the plurality of user preferences to the plurality of images is used in a method of identifying the transfer style expected to be preferred by a user, less processing than the process of learning the preferences is enough to infer a preference value to a certain image after the learning of the AI model is completed. Therefore, when the AI model, the training of which is completed, is applied to the display apparatus 100, the process of the display apparatus 100 is sufficient to identify the transfer style expected to be preferred by a user. Likewise, this is also applied to the process of transferring the first image into the second image based on a certain transfer style. In other words, when the process of transferring the first image into the second image based on a certain transfer style is carried out by the AI model that has learned the transfer style through the deep learning technique or the like in an AI neural structure or the like, only the process of the display apparatus 100 is sufficient to generate the second image by introducing the AI model, of which the learning about the style transfer is completed, to the display apparatus 100 and converting the image the characteristic of the first image.

This embodiment will be described in detail with reference to FIGS. 16 to 19.

Figure 16:
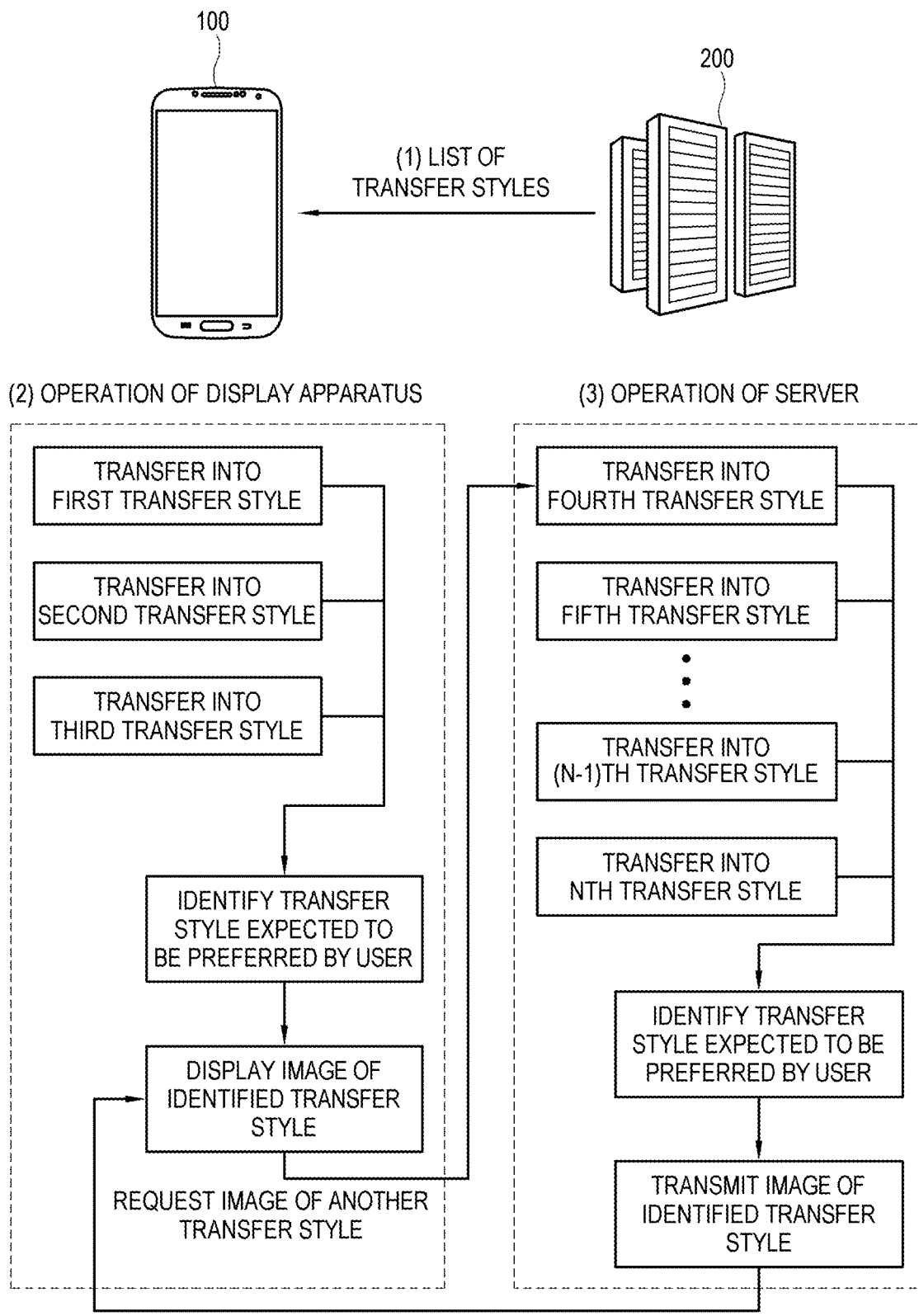
FIGS. 16, 17, 18, and 19 are diagrams showing examples of the display apparatus 100 providing a primary recommendation and the server 200 providing a secondary recommendation according to an embodiment of the disclosure.
Figure 17:
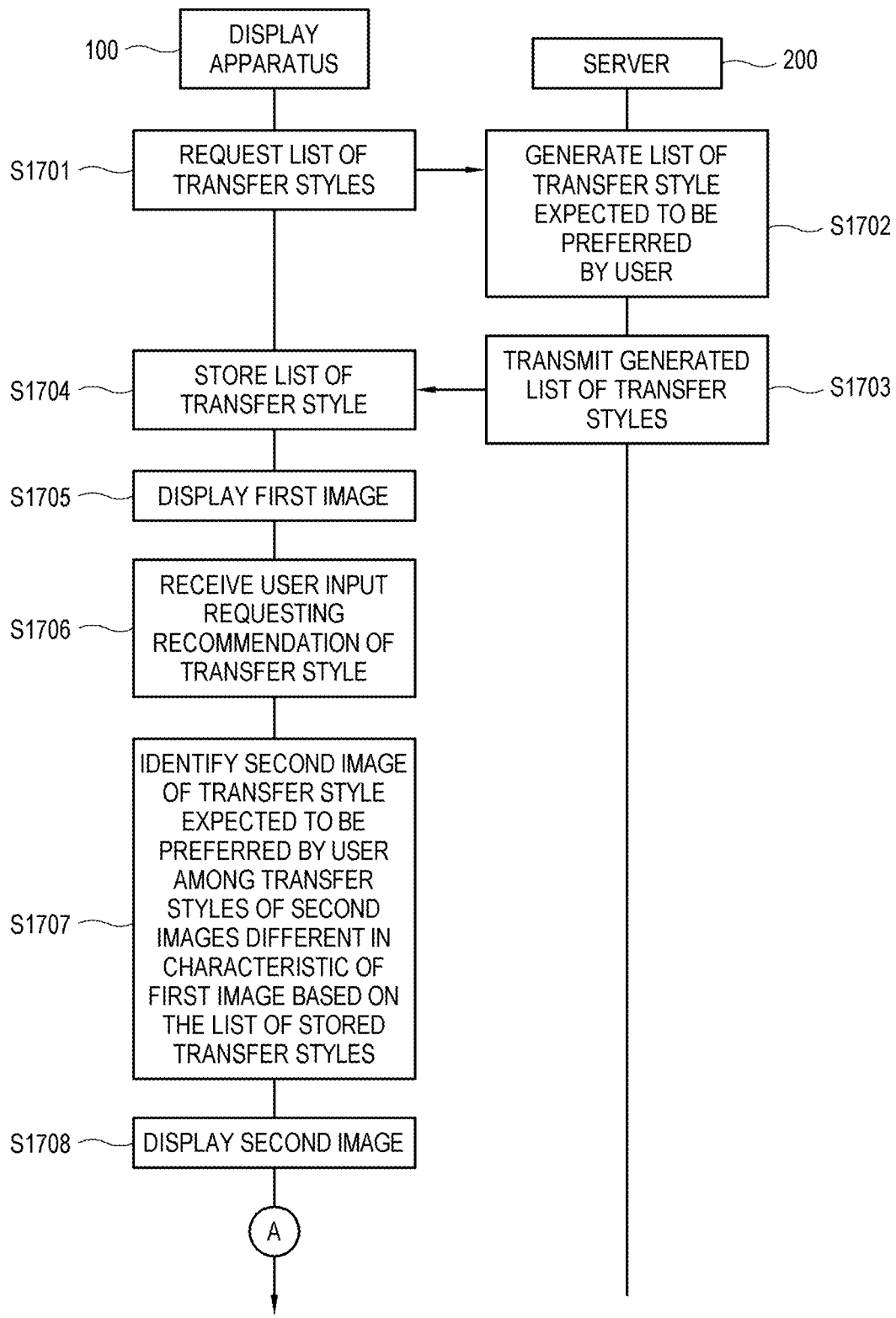
Figure 18:
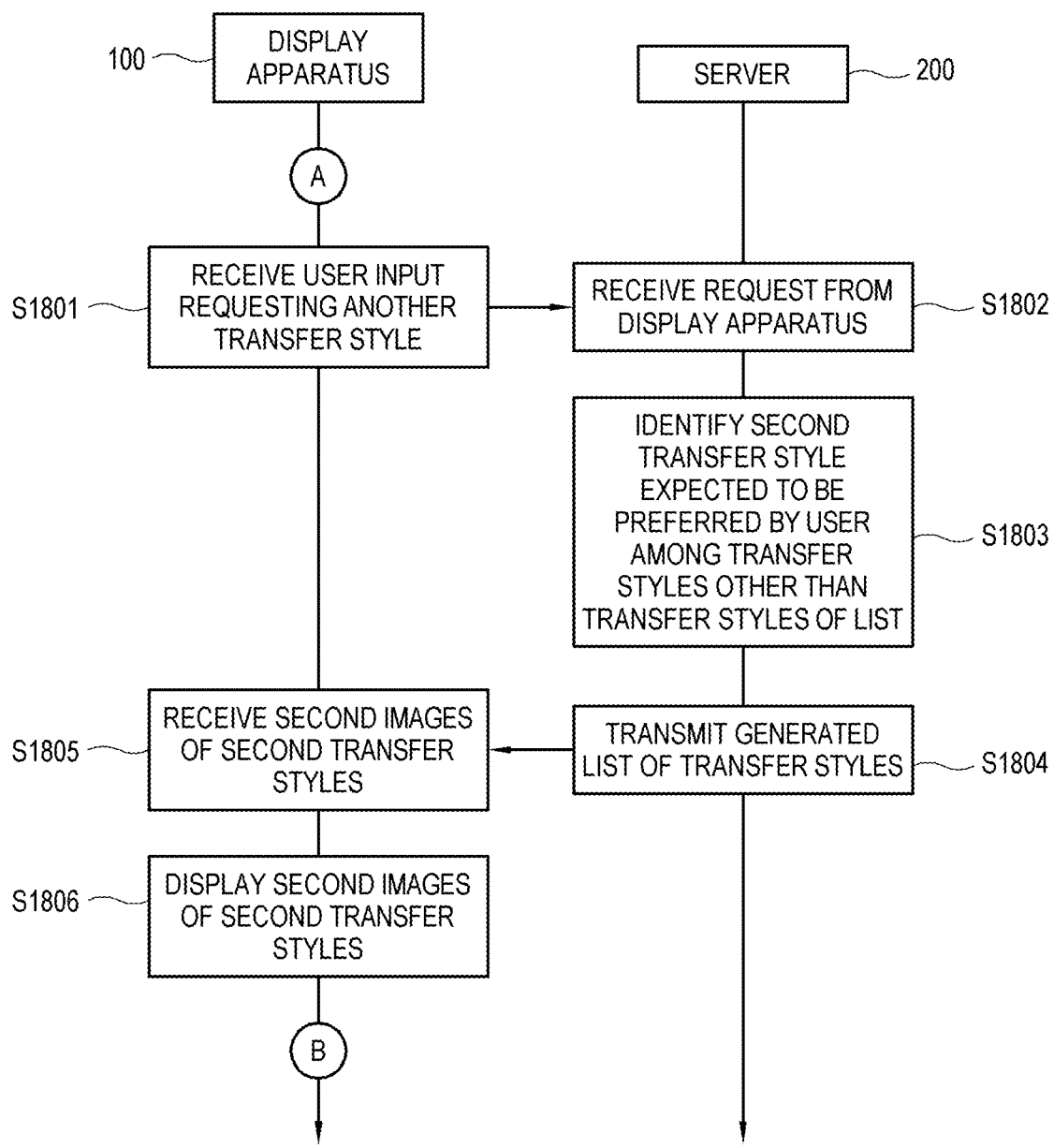

When the processor 104 of the display apparatus 100 makes a request for a list of transfer styles to the server 200 (S1701), the processor 202 of the server 200 generates the list of transfer style expected to be preferred by a user (S1702) and transmits the list to the display apparatus 100, and the processor 104 of the display apparatus 100 receives and stores the list of transfer styles from the server 200 (S1704) (see (1) in FIG. 16).

There are no specific limits to the method of the processor 202 of the server 200 to make the list of transfer style expected to be preferred by a user. For example, the processor 202 may generate the list with reference to information about favorite styles of the user registered by a registration request of the user or the like, may generate the list based on preference values inferred by the NIMA model with regard to the representative images of the transfer styles, or may generate the list by randomly selecting some of the transfer styles.

When the list received from the server 200 may for example is sorted into a first transfer style, a second transfer style, and a third transfer style, the processor 104 of the display apparatus 100 receives an AI model, of which the learning about the first to third transfer styles is completed (hereinafter, referred to as a 'first transfer style model,' etc.), and an AI model, of which the learning is completed to identify the transfer style expected to be preferred by a user (hereinafter, referred to as the 'NIMA model') from the server 200. Therefore, the display apparatus 100 can independently generate the transferred images and identify the transfer style expected to be preferred by a user.

Then, when the first image is displayed on the display apparatus 100 (S1705), and a user input for making a request for a transfer style recommendation is received with regard to the first image (S1706), the processor 104 of the display apparatus 100 identifies the second image of transfer style expected to be preferred by the user among the transfer styles of the second images different in the characteristic of the first image based on the list of stored transfer styles (S1707), and displays the second image S1708). In other words, the processor 104 of the display apparatus 100 generates the second images having different transfer styles corresponding to the first to third transfer styles based on the first to third transfer style models, and applies the NIMA model to the generated second images, thereby identifying the transfer style expected to be preferred by a user and recommending the identified transfer style to the user (see (2) in FIG. 16). However, it is not essential to apply the NIMA model. Alternatively, the processor 104 may identify a transfer style expected to be preferred by a user from the second images having the different transfer styles corresponding to the first to third transfer styles based on information about the favorite style of the user, the user history of the user about the selection of the transfer style, etc. without applying the NIMA model, or may allow the user to directly select one of the second images having different transfer styles corresponding to the first to third transfer styles without performing the identification.

In the foregoing embodiment described with reference to FIG. 15, the results of the primary recommendation are previously stored in the display apparatus 100, but the generation of the second image by transferring the first image according to the first transfer style and the identification of second image expected to be preferred by a user through the assessment or the like are performed in the processor 202 of the server 200.

On the other hand, in this embodiment, both the transfer of the first image into the second images corresponding to the transfer styles and the identification of second image expected to be preferred by a user among the second images, which follow the process of receiving the list of transfer styles from the server 200, are all performed in the processor 104 of the display apparatus 100. In other words, the primary recommendation for the transfer style in this embodiment is carried out by the independent process of the display apparatus 100.

When a user finally accepts the image of the primary recommendation, the transfer style recommendation service is finished. On the other hand, when a user additionally makes a request for another transfer style, the secondary recommendation based on the process of the server 200 is carried out. Specifically, when a user input for requesting another transfer style is received in the display apparatus 100 (S1801), the processor 202 of the server 200 receives the request from the display apparatus 100 (S1802), identifies second transfer style expected to be preferred by the user among other transfer styles than the transfer styles in the list (S1803), and transmits the identified second image of the second transfer style to the display apparatus 100 (S1804). In other words, the processor 202 of the server 200 generates the second images of different transfer styles corresponding to transfer styles (e.g. a fourth transfer style an nth transfer style) other than the first to third transfer styles, and identifies a transfer style expected to be preferred by a user through the NIMA model applied to the generated second images, thereby recommending the identified transfer style to a user (see (3) in FIG. 16).

Then, the processor 104 of the display apparatus 100, which receives the second image of the second transfer style from the server 200 as described above, controls the display apparatus 100 to display the received second image on the display 102 (S1806), thereby providing the secondary recommendation service to the user.

Thus, without using the server, only the process of the display apparatus is sufficient to provide the transfer style recommendation service, thereby improving the service providing speed.

Further, the list of transfer styles in this embodiment may be dynamically varied depending on a history of recommended second images selected by a user. For example, when a user does not accept the second image of the primary recommendation, but finally accepts the second image of the secondary recommendation, the processor 104 of the display apparatus 100 may add the transfer style of the second image finally accepted by the user to the list of transfer styles or replace one transfer style in the list with the transfer style of the second image finally accepted by the user based on the acceptance information. The server 200 may also be informed of such changes in the list of transfer styles.

Figure 19:
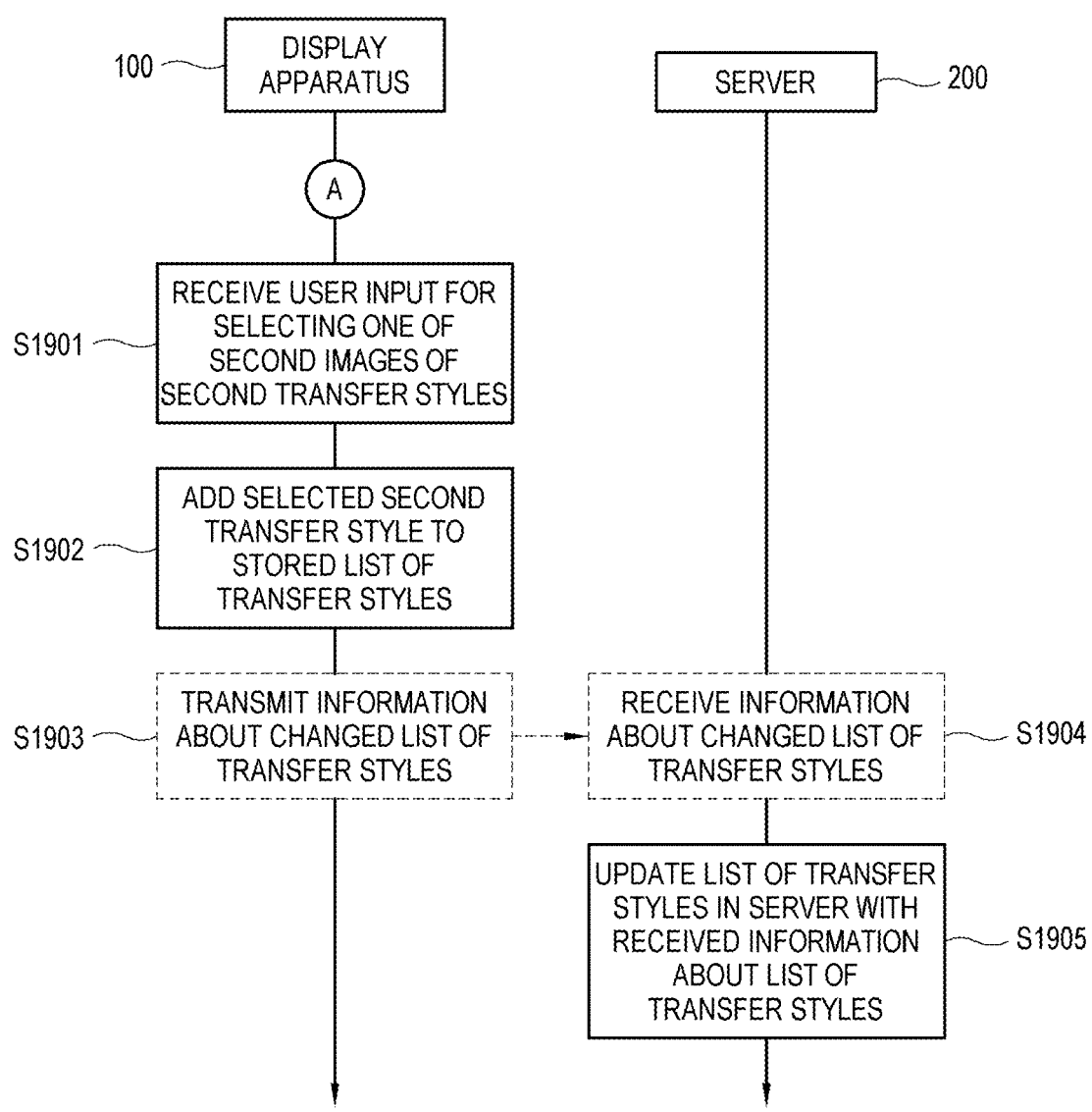

In this regard, FIG. 19 shows an example of operation between the display apparatus 100 and the server 200 according to an embodiment. For example, in response to a user input of selecting one of the second images corresponding to the second transfer styles (S1901), the processor 104 of the display apparatus 100 may add the second transfer style finally accepted by the user to the list of transfer styles stored in the display apparatus 100 (S1902). Further, the processor 104 of the display apparatus 100 may also transmit information about the changed list of transfer styles to the server 200 (S1903). The server 200 receives the information about the changed list of transfer styles from the display apparatus 100 (S1904), and updates its own list of transfer styles with the received information about the list of transfer styles (S1905).

Meanwhile, according to an embodiment of the disclosure, the characteristic of the transfer styles may be varied depending on a user's preference. In other words, the processor 104 of the display apparatus 100 or the processor 202 of the server 200 may modify the characteristic of the transfer style not preferred by a user, based on information about favorite styles of the user. In this regard, an example will be described with reference to FIG. 20.

Figure 20:
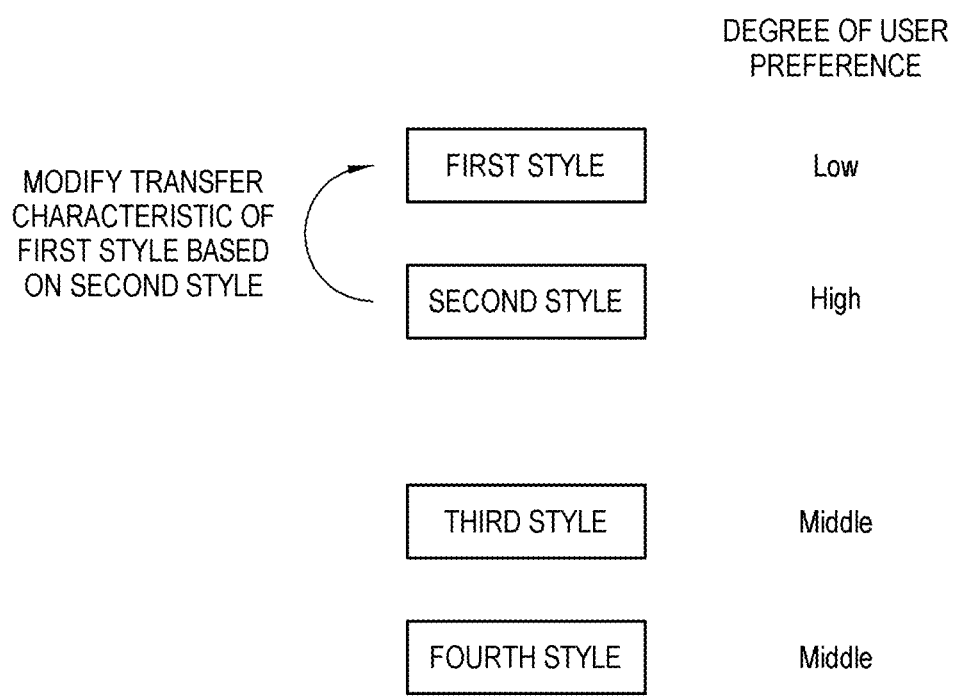
FIG. 20 is a diagram schematically showing operation of changing a transfer characteristic of a transfer style to match a user preference according to an embodiment of the disclosure.

When a degree of preferences of the user to the transfer styles are for example respectively identified as 'low,' 'high,' 'middle' and 'middle' with regard to a first style, a second style, a third style and a fourth style as shown in FIG. 20 from a result of using the transfer style recommendation service according to the disclosure to some extent, the processor 202 of the server 200 may modify the characteristic of the first style, to which the preference of the user is relatively low, based on the second style to which the preference of the user is relatively high. As the modifiable characteristic of the transfer style, there may for example be the color, chroma, brightness, contrast, outline presence, outline type and thickness, brush type and thickness, texture size, etc. of the image without limitations. As a concrete example for the method of modifying the characteristic of the transfer style, the processor 202 of the server 200 may modify a weight value of an edge input to or output from a node corresponding to a certain transfer characteristic, when a transfer image is generated based on the AI neural network.

The foregoing example describes that the processor 202 of the server 200 modifies the transfer characteristic of the transfer style, but the modification of the transfer characteristic is not limited thereto. Alternatively, when the model of the transfer style is stored in the display apparatus 100, the transfer characteristic of the transfer style may be modified by the processor 104 of the display apparatus 100.

Thus, the transfer characteristic of the transfer style may be varied depending on preferences of a user.

As described above, according to the disclosure, the image of the transfer style expected to be preferred by a user is automatically recommended, thereby improving a convenience and service satisfaction of the user when using the style transfer service.

Thus, when a user uses a style transfer service, the display apparatus 100 automatically recommends an image of a transfer style expected to be preferred by a user, thereby improving user convenience and service satisfaction.

Thus, it is possible to secure reliability of automatic recommendation for a transfer style expected to be preferred by a user.

Thus, it is possible to speed up a transfer style recommendation service.

Thus, it is possible to improve reliability on an automatic recommendation for a transfer style expected to be preferred by a user.

Thus, without using a server, the process of the display apparatus is sufficient to provide a transfer style recommendation service, thereby improving a service providing speed.

Thus, the transfer characteristic of the transfer style are changed to match a preference of the user.

Embodiments of the disclosure describe above may be implemented as a computer program including computer-executable instructions. The computer program and computer-executable instructions thereof may be stored in a non-transitory computer-readable recording medium. Accordingly, the operations of the embodiments described above may be performed by the display apparatus and the server when executing the computer-readable instructions of the computer program. The computer program may be executed by one or more of the display apparatus and the server, and the computer program may be downloaded to an electronic apparatus or the server through a network.

Although embodiments have been shown and described, it will be appreciated by those skilled in the art that changes may be made in these embodiments without departing from the principles and spirit of the disclosure, the scope of which is defined in the appended claims and their equivalents.

What is claimed is:

1. A server comprising:
a communicator; and
a processor configured to:
   receive information about a first image selected by a user from a display apparatus,
   convert the first image to a plurality of second images with a plurality of transfer styles according to the information about the first image,
   identify a plurality of user preferences to the plurality of second images inferred by an artificial intelligence (AI) model, wherein the AI model has learned the plurality of user preferences scored by users for a plurality of third images according to characteristics of the plurality of third images,
   identify a second image with a first transfer style having a highest score of user preference among the identified plurality of user preferences based on a characteristic of the first image, and
   transmit the second image having the first transfer style to the display apparatus,
wherein the processor is further configured to:
   identify at least one first characteristic of the first transfer style and a second characteristic of a second transfer style, the second characteristic of the second transfer style having a higher user preference than the at least one first characteristic of the first transfer style, and
   based on the second transfer style, modify the at least one first characteristic of the first transfer style to improve a user preference of the first transfer style.

2. The server according to claim 1, wherein the processor is further configured to identify a category of the first image, and identify the first transfer style corresponding to the category of the first image.

3. The server according to claim 1, wherein the processor is further configured to obtain information about a favorite style information of the user, and identify the first transfer style based on the information about a favorite style of the user.

4. A display apparatus comprising:
a display;
a storage;
a communicator; and
a processor configured to:
   control to store in the storage a list of transfer styles, by which at least one characteristic of an image is differently converted, received from a server through the communicator,
   control the display to display a first image selected based on a user input,
   convert the first image to a plurality of second images with a plurality of transfer styles according to information about the first image,
   identify a plurality of user preferences to the plurality of second images inferred by an artificial intelligence (AI) model, wherein the AI model has learned the plurality of user preferences scored by users for a plurality of third images according to characteristics of the plurality of third images,
   identify a second image with a first transfer style having a highest score of user preference among the identified plurality of user preferences based on a characteristic of the first image, generate the second image by converting the characteristic of the first image, based on the list of transfer styles, and control the display to display the second image, wherein the processor is further configured to:

identify at least one first characteristic of the first transfer style and a second characteristic of a second transfer style, the second characteristic of the second transfer style having a higher user preference than the at least one first characteristic of the first transfer style, and based on the second transfer style, modify the at least one first characteristic of the first transfer style to improve a user preference of the first transfer style.

5. The display apparatus according to claim 4, wherein the processor is further configured to obtain the second image from the server through the communicator and control the display to display the second image, based on a second user input for requesting another transfer style.

6. The display apparatus according to claim 5, wherein the processor is further configured to add a selected transfer style to the list of transfer styles, based on a third user input for selecting the second image having the selected transfer style.

* * * * *